United States Patent
Morimoto et al.

(10) Patent No.: US 6,806,905 B1
(45) Date of Patent: Oct. 19, 2004

(54) DIGITAL CAMERA

(75) Inventors: Yasuhiro Morimoto, Takatsuki (JP);
Masahito Niikawa, Sakai (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/513,391

(22) Filed: Feb. 25, 2000

(30) Foreign Application Priority Data

Feb. 26, 1999 (JP) .......................................... 11-051730

(51) Int. Cl.[7] .............................................. H04N 5/222
(52) U.S. Cl. .................. 348/333.02; 348/345; 348/141; 356/628; 356/229
(58) Field of Search ...................... 348/333.02, 333.03, 348/350, 345, 346, 152, 745, 141, 136, 140, 135, 348; 382/106, 154; 396/121, 123; 356/625, 628, 229, 3.01, 4.03

(56) References Cited

U.S. PATENT DOCUMENTS

| | | | | |
|---|---|---|---|---|
| 4,693,378 A | * | 9/1987 | Azegami et al. | ............ 209/586 |
| 4,847,687 A | * | 7/1989 | McDonnell et al. | ........ 348/140 |
| 4,908,704 A | * | 3/1990 | Fujioka et al. | ............... 348/155 |
| 4,980,763 A | * | 12/1990 | Lia | .............................. 348/67 |
| 5,331,419 A | * | 7/1994 | Yamada et al. | ................ 348/140 |
| 5,479,261 A | * | 12/1995 | Hansen | ....................... 356/628 |
| 5,742,699 A | * | 4/1998 | Adkins et al. | ............... 382/107 |
| 5,920,348 A | * | 7/1999 | Ejima | ......................... 348/341 |
| 6,101,408 A | * | 8/2000 | Craine et al. | ................ 600/425 |
| 6,108,033 A | * | 8/2000 | Ito et al. | ...................... 348/152 |
| 6,154,253 A | * | 11/2000 | Kiri et al. | .................... 348/345 |
| 6,268,967 B1 | * | 7/2001 | Kubo | ......................... 359/696 |
| 6,310,662 B1 | * | 10/2001 | Sunakawa et al. | .......... 348/747 |
| 6,415,043 B1 | * | 7/2002 | Josefsson | .................... 382/103 |

FOREIGN PATENT DOCUMENTS

| | | | |
|---|---|---|---|
| JP | 5-14779 | 1/1993 | |
| JP | 5-18748 | 1/1993 | |
| JP | 5-22661 | 1/1993 | |
| JP | 5-30412 | 2/1993 | |
| JP | 5-45124 | 2/1993 | |
| JP | 5-45125 | 2/1993 | |
| JP | 5-56389 | 3/1993 | |
| JP | 5-79820 | 3/1993 | |
| JP | 5-153467 | 6/1993 | |
| JP | 5-153468 | 6/1993 | |
| WO | WO 9830976 A1 | * 7/1998 | ............. G06T/7/00 |
| WO | WO 9830977 A1 | * 7/1998 | ............. G06T/7/00 |

* cited by examiner

*Primary Examiner*—Tuan Ho
*Assistant Examiner*—Lin Ye
(74) *Attorney, Agent, or Firm*—Sidley Austin Brown & Wood LLP

(57) ABSTRACT

A digital camera is provided with a display for displaying an image of an object and a specifying unit for specifying a plurality of measuring points on the display. An actual area of a region surrounded by the plurality of measuring points specified by the specifying unit are calculated by a calculator.

20 Claims, 8 Drawing Sheets

C : PHOTOGRAPHING DIRECTION
(PHOTOGRAPHING CENTRAL DIRECTION)
P1-P3 : MEASURING POINT

DIGITAL CAMERA

The present invention claims a priority based on the Japanese Patent Application No. H11-51730, the contents of which is incorporated hereinto by reference in its entirety.

BACKGROUND OF THE INVENTION

1. Field of the Invention

This invention relates to a digital camera.

2. Description of Related Art

As it is well known, there are many digital cameras equipped with a distance measuring mechanism for measuring a distance from the camera to the object to automatically focus an optical image of the object passed through a photographing lens onto a light receiving surface of an image pick-up element such as a charge-coupled device (hereinafter referred to as "CCD"). In details, in such digital cameras, a distance from the camera to the object is measured by the distance measuring mechanism, and the image pick-up lens is driven in a direction of the optical axis thereof depending on the measured distance to automatically focus the optical image of the object onto the light receiving surface of the CCD. Then, the optical image of the object focused on the CCD is photoelectrically converted into analog signals. The analog signals are converted into digital signals which are then subjected to a prescribed image processing to form image data. The image data are displayed as a photographed image on the liquid crystal display (hereinafter referred to as "LCD").

In the mean time, it has been proposed that a digital camera has not only a function for recording and reproducing the photographed image but also a function for recording measured information on a distance from the camera to the object utilizing the aforementioned distance measuring mechanism.

Conventionally, a digital camera having such a measuring function is disclosed in, for example, Unexamined Laid-open Japanese Patent Publication Nos. 5-153467, 5-153468, 5-79820, 5-56389, 5-45124, 5-45125, 5-30412, 5-26622, 5-22661, 5-18748, 5-14779, etc.

Some of these digital cameras can record the distance information of the object or the size information of the object calculated based on the distance information and the photographing angle information in a recording medium together with the photographed image of the object.

By the way, in order to accelerate a development of a measuring function of such digital cameras, it has been expected that a digital camera which can measure an area of a certain region of a place away from the photographing position, i.e., the camera position, is realized. However, in a digital camera having a conventional measuring function, the function is limited to measure a size of the object. None of the aforementioned prior arts discloses technique for calculating the aforementioned area and recording the calculated information.

Furthermore, none of the prior arts fails to disclose or suggest any concept utilizing a depression angle or an elevation angle of the photographing direction (the direction of the photographing lens). Therefore, it was impossible to calculate the relative position of the measuring point relative to the photographing camera position because it was unable to specify a reference plane such as a horizontal plane in a photographing image. As a result, a height of an object such as a height of a building cannot be measured precisely.

SUMMARY OF THE INVENTION

A first object of the present invention is to provide a digital camera by which a user can easily know an area of a certain region of a place away from a photographing position.

A second object of the present invention is to provide a digital camera by which a relative position of a specified measuring point relative to a photographing position can be specified to enable a measurement of a height of an object or the like.

A third object of the present invention is to provide a method to be employed in a digital camera by which an area of a certain region of a place away from a photographing position can easily be known.

A fourth object of the present invention is to provide a method to be employed in a digital camera by which a relative position of a specified measuring point relative to a photographing position can be specified to enable a measurement of a height of an object or the like.

According to a first aspect of the present invention, a digital camera includes a display for displaying an image of an object, a specifying unit for specifying a plurality of measuring points on the display, and a calculator for calculating an actual area of a region surrounded by the plurality of measuring points specified by the specifying unit.

With this digital camera, since the actual area of a region surrounded by the plurality of measuring points specified by the specifying unit can be measured, a user can easily know an area of any desired place away from the photographing position.

According to a second aspect of the present invention, a digital camera includes a display for displaying an image of an object, a specifying unit for specifying a plurality of measuring points on the display, a first detector for detecting a distance from the digital camera to each of the plurality of measuring points of the object, a second detector for detecting a camera angle of each of the plurality of measuring points, a third detector for detecting a photographing direction, and a calculator for calculating a relative position of each of the plurality of measuring points relative to a photographing position, based on detected results of the first, second and third detectors.

With this digital camera, since a reference plane such as a horizontal plane can be specified in a photographing image by detecting the photographing direction, the relative position of a measuring point relative to the photographing position can be measured, which enables a measurement of a height of an object or the like.

According to a third aspect of the present invention, a method for calculating an area of an object in a digital camera includes the steps of displaying an image of the object on a display, calculating a distance from the digital camera to each of a plurality of measuring points specified on the display, calculating an angle of each of the plurality of measuring points relative to said camera, and calculating an actual area of a region surrounded by the plurality of measuring points, based on the calculated distances and the angles.

With this method, since the actual area of the region surrounded by the plurality of measuring points can be calculated, a user can easily know an area of a region of any desired place away from the photographing position.

According to a fourth aspect of the present invention, a method for calculating a relative position of an object relative to a digital camera includes the steps of displaying an image of the object on a display, calculating a distance from the digital camera to each of a plurality of measuring points specified on the display, detecting an angle of each of the plurality of measuring points relative to said camera, detecting a photographing direction, and calculating a relative position of the measuring points relative to the photographing position, based on information on the detected distance of the object, angles and photographing direction.

With this method, since a reference plane such as a horizontal plane can be specified in a photographing image by detecting the photographing direction, the relative positions of the measuring points relative to the photographing position can be obtained. This enables a measurement of a height of an object or the like.

BRIEF DESCRIPTION OF THE DRAWINGS

The above and other objects, features, and advantages of the present invention will be apparent from the following detailed description of the preferred embodiments with reference to the attached drawings, wherein.

DETAILED DESCRIPTION OF THE PREFERRED EMBODIMENTS

An embodiment of a digital camera according to the present invention will be explained with reference to the drawings.

Principle

Figure 1:
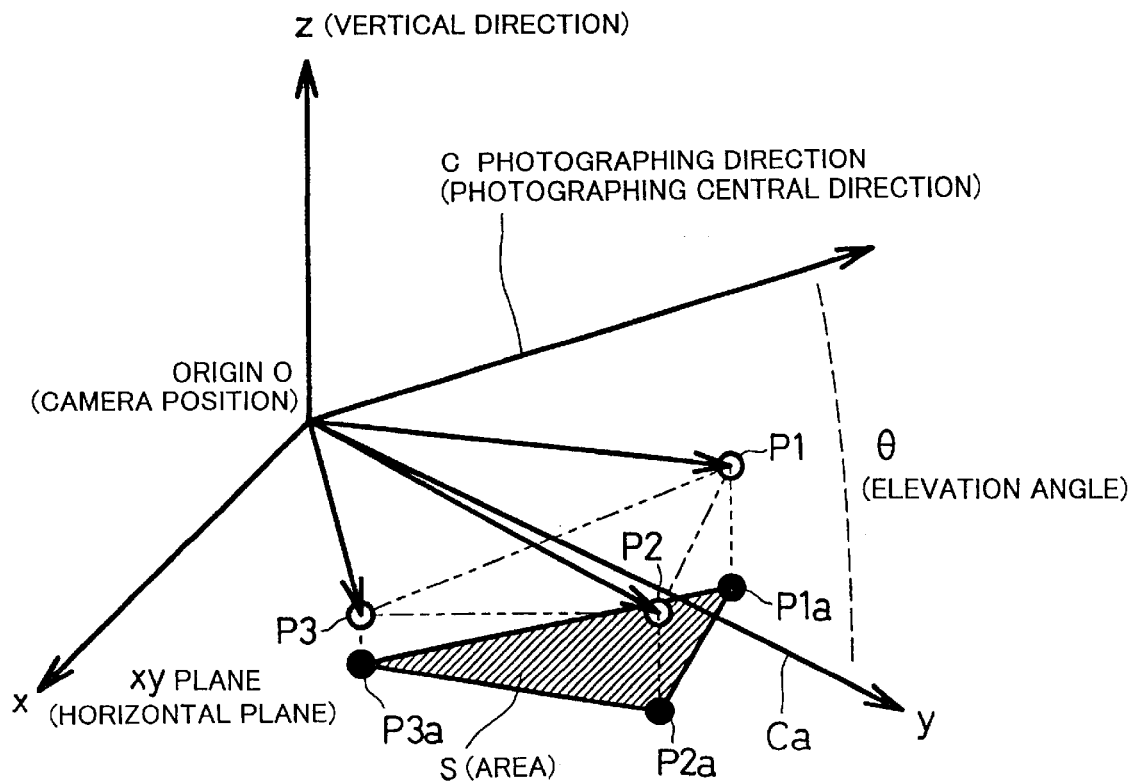
FIG. 1 is a principle explanatory diagram of a main portion of a digital camera according to an embodiment of the present invention.
Figure 2:
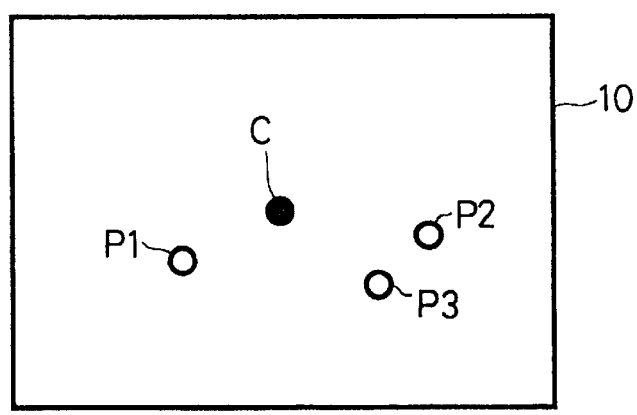
FIG. 2 is an explanatory diagram of a screen display when an angle of each of the measuring points shown in FIG. 1 is detected.

With reference to FIG. 1, the principle of the present invention will be explained in the case where a projected area S of the triangular shaped land ($\Delta$P1P2P3) located at a slope is measured.

In a three-dimensional coordinate (x, y, z), it is assumed that a digital camera 1 is located on the origin O. The reference letter "Z" denotes a vertical direction, and the xy-plane corresponds to a horizontal plane. The reference letters "P1," "P2" and "P3" denote three measuring points specified for calculating the area of the region surrounded by segments connecting the aforementioned three measuring points, wherein these measuring points P1, P2 and P3 are assumed to be located at an inclined land.

In order to calculate the area of the triangular shaped land $\Delta$P1P2P3, the aforementioned measuring points P1, P2 and P3 are specified on the screen of the LCD display 10. Then, the distance from the origin O to each of the measuring points P1, P2 and P3 is calculated by utilizing the distance measuring mechanism for an automatic focusing.

Next, each position of P1, P2 and P3 on the LCD display 10 is specified. The angle formed between the segment O-P1 and the segment O-P2 (the angle P1-O-P2) can be calculated from the focal length of the photographing lens 301 and the distance between the measuring point P1 and the measuring point P2 on the screen. The actual distance between the measuring point P1 and the measuring point P2 can be calculated from the distance between the origin O and the measuring point P1, the distance between the origin O and the measuring point P2 and the angle P1-O-P2. Similarly, the actual distances between the measuring point P3 and the measuring point P2 and between the measuring point P3 and the measuring point P1 can be calculated. Accordingly, the area of the triangular shaped land $\Delta$P1P2P3 can be calculated.

As apparent from the above, since it is possible to calculate the area of the triangular shaped land $\Delta$P1P2P3, an area of any land (object) of any shape can be calculated by increasing measuring points to be specified and dividing the shape into a plurality of triangular shapes.

Next, a projection of the photographing central direction C of the digital camera 1 on the xy-plane is defined as a central direction Ca, and the coordinate system is set such that the projected central direction Ca coincides with the y-axis.

When the elevation angle (or the depression angle) $\theta$ which is an angle formed between the photographing central direction C and the horizontal plane (reference plane) is detected, the coordinates of P1, P2 and P3 can be specified in the xyz-coordinate system. As a result, the height of the measuring points P1, P2 and P3 (the value on the z-axis) can be obtained.

Furthermore, the actual area S of the region surrounded by the segments connecting the projected measuring points P1$a$, P2$a$ and P3$a$ on the horizontal plane can also be obtained.

As it is obvious from the above explanation, if only an area of a region surrounded by the segments connecting the measuring points P1, P2 and P3 is to be calculated, it is only required to know each distance between two measuring points P1, P2 and P3 and each relative angle thereof. Therefore, it is not necessarily required to obtain the elevation angle (or the depression angle) $\theta$ of the photographing central direction C. Furthermore, instead of obtaining the elevation angle (or the depression angle) $\theta$ relative to the center of the photographing view of the digital camera 1, an elevation angle (or depression angle) relative to any specified point of a photographing view may be obtained.

Explanation of a Digital Camera

A digital camera according to one embodiment of the present invention will be explained with reference to FIGS. 3–5.

Figure 3:
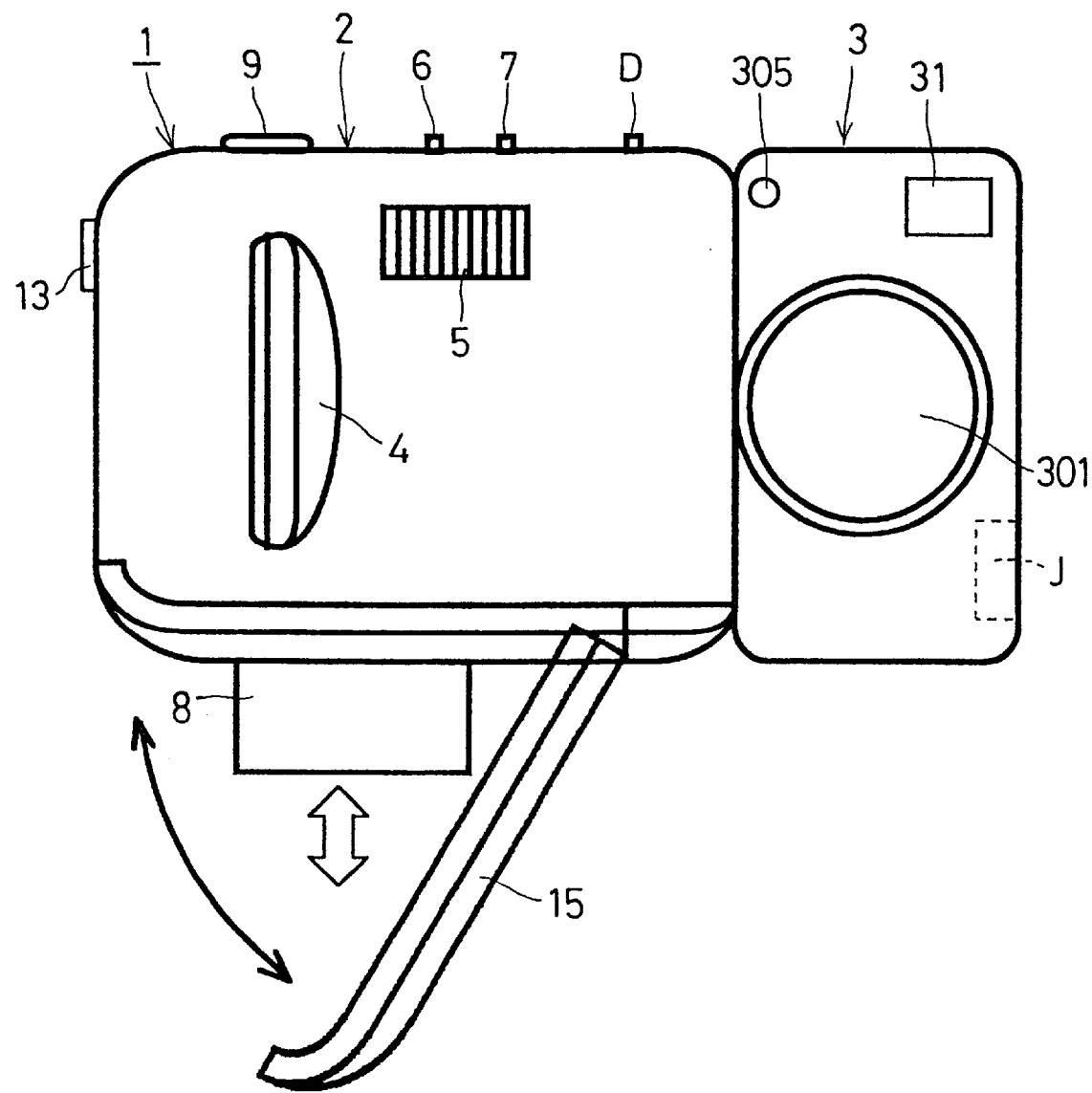
FIG. 3 is a front view of the digital camera.

As shown in FIG. 3, the digital camera 1 comprises a box-shaped camera main body 2 and an image sensing unit 3 having an elongated rectangular parallelepiped shape. The image sensing unit 3 is detachably connected to the right side of the camera main body 2 in the front view shown in FIG. 3.

Figure 6:
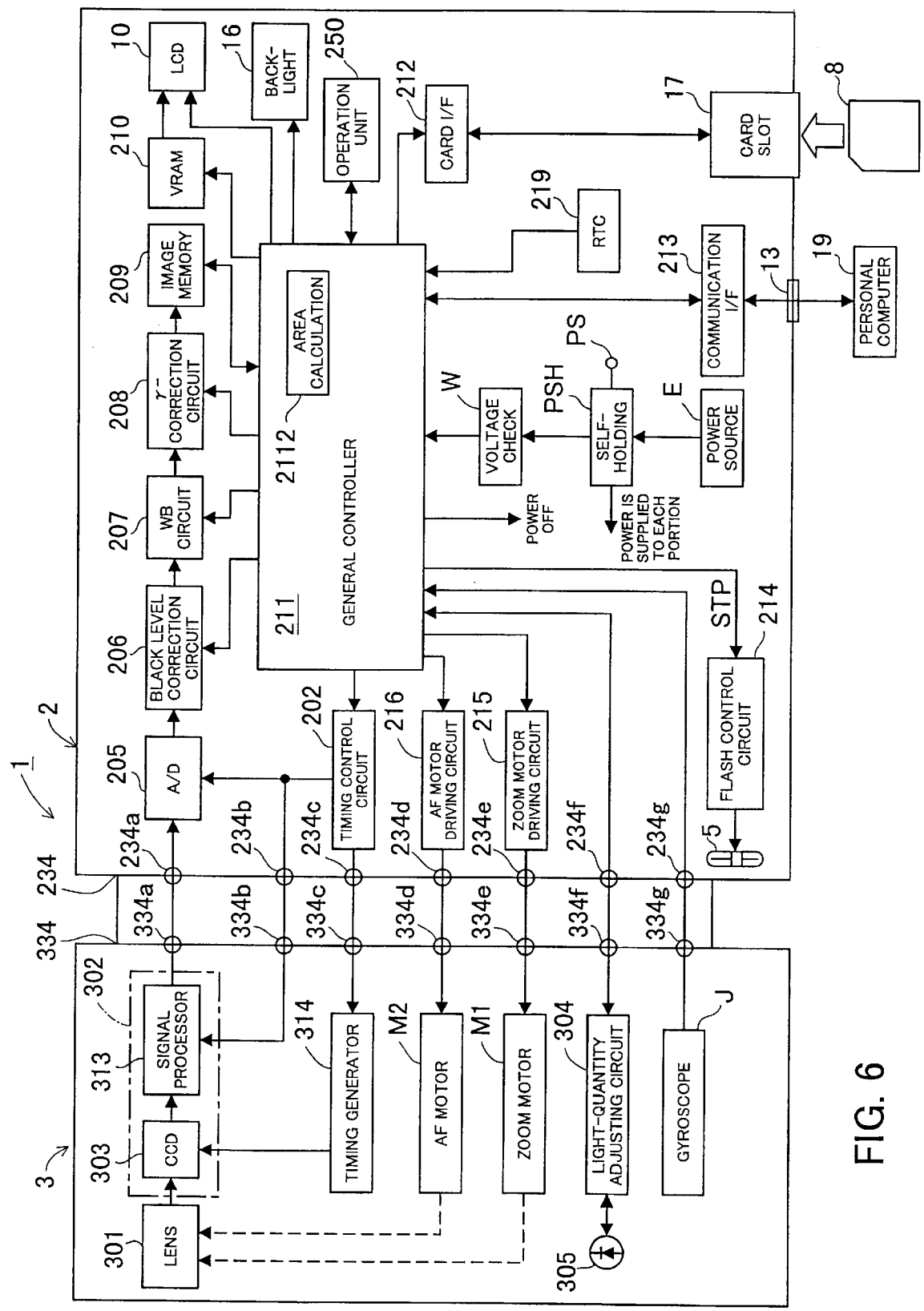
FIG. 6 is a block diagram showing a control system of the digital camera.

In the image sensing unit 3, an image pick-up circuit 302 including a CCD color area sensor 303 as one example of an image pick-up element, is disposed at an appropriate portion behind a zoom lens 301 as an image taking lens as shown in FIG. 6. In the image sensing unit 3, a light-quantity adjusting circuit 304 (see FIG. 6) connected to a light-adjusting sensor 305 for receiving the light of the flash 5 reflected from the object, is provided at an appropriate position. The light-adjusting sensor 305 is positioned at an appropriate position of the front end surface of the image sensing unit 3. In the image sensing unit 3, a gyro J for detecting the elevation angle (or the depressing angle) θ (see FIG. 1) of the zoom lens 301 of the digital camera 1 is provided.

Furthermore, as shown in FIG. 6, provided in the image sensing unit 3 are a zoom motor M1 for changing the zoom ratio of the zoom lens 301 and for moving the zoom lens between the stand-by position and the image taking position and an automatic focusing motor (AF motor) M2 for automatically focusing the optical image of the object onto the light receiving surface of the CCD 303. The zoom motor M1 and the AF motor M2 are rotatably driven by a zoom motor driving circuit 215 and an AF motor driving circuit 216, respectively.

Furthermore, the image sensing unit 3 is provided with an optical finder 31 used in a silver halide lens shutter camera.

Figure 4:
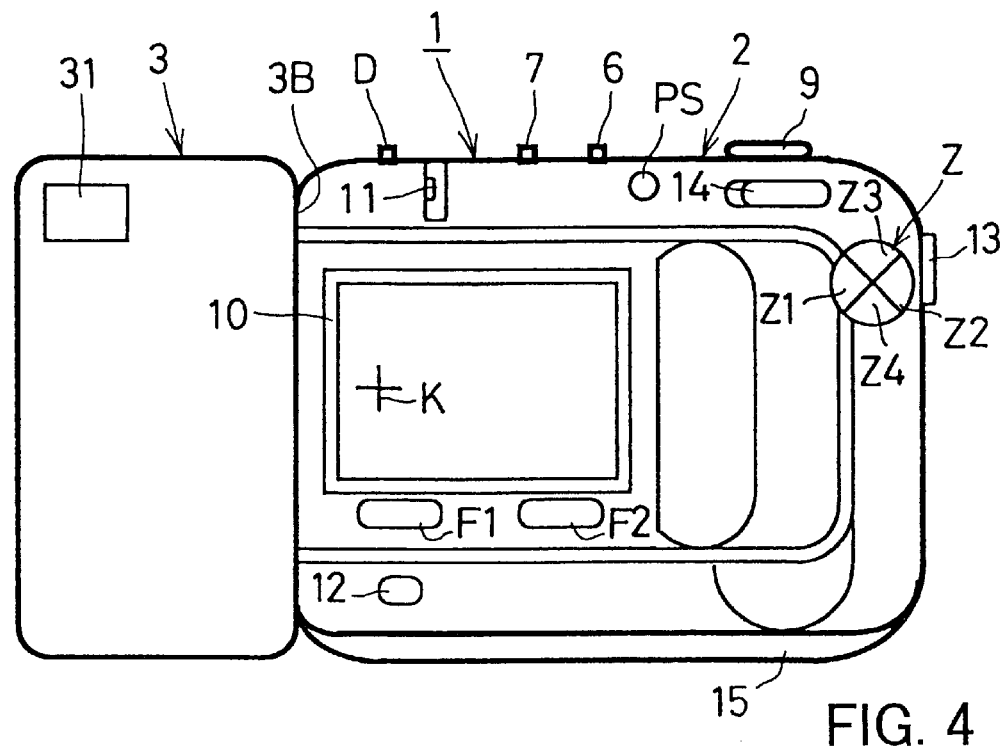
FIG. 4 is a rear view of the digital camera.
Figure 5:
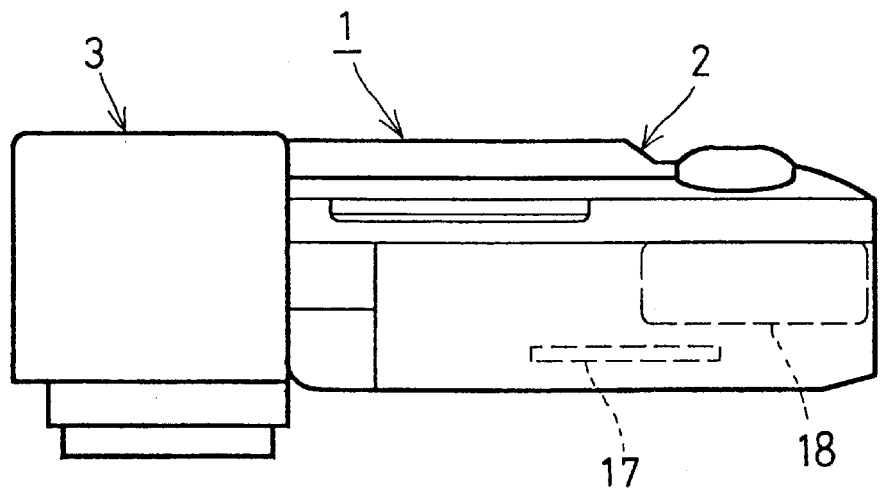
FIG. 5 is a bottom view of the digital camera.

As shown in FIGS. 3 to 5, the camera main body 2 has a display 10, such as an LCD (Liquid Crystal Display), a slot 17 for receiving a memory card 8, and a connection terminal 13 for connecting the digital camera 1 to a personal computer 19 (see FIG. 6) or the like. The image signal taken by the image sensing unit 3 is subjected to a prescribed image processing in the camera main body 2. The processed image is displayed on the LCD 10, recorded in the memory card 8 and/or transferred to the personal computer 19. At a rear surface side of the LCD 10, a back-light 16 (see FIG. 6) is provided.

A grip 4 is formed in the left-hand side of the front face of the camera main body 2, and a built-in flash lamp 5 is provided in the right-hand upper side at an appropriate position. Frame forwarding and backwarding switches 6 and 7 are provided near the center of the top face of the main body 2. The forwarding switch 6 (hereinafter referred to as "UP switch") feeds the frame in the direction that the frame number increases in the photographed order, and is referred to as an UP switch 6. The backwarding switch 7 (hereinafter referred to as "DOWN switch") feeds the frame in the direction that the frame number decreases. A delete switch D for deleting the images recorded in the memory card 8 is provided on the left side of the DOWN switch 7, and a shutter button 9 is provided on the right side of the UP switch 6 in the rear view shown in FIG. 4.

An LCD 10 is provided in the middle of the left-hand side of the rear face of the camera main body 2. The LCD 10 functions as a view finder during image taking, and as a display during the reproduction of the recorded image. Provided at the lower side of the LCD 10 is a compression rate setting switch 12 for switching the compression rate K of the image data to be recorded in the memory card 8. Provided at the upper side of the LCD 10 are a power switch PS and a flash lamp (which may be abbreviated as "FL") mode setting switch 11. At a side face of the main body 2, a connection terminal 13 is provided.

A photographing/reproduction mode setting switch 14 for switching between a "photographing mode" and a "reproduction mode" is positioned at the top right of the rear face of the main body 2. Digital pictures are taken in the photographing mode.

In the reproduction mode, the digital images recorded in the memory card 8 are reproduced and displayed on the LCD 10. The photographing/reproduction mode setting switch 14 is also a bicontact slide switch. For example, if the switch is shifted to the right, the reproduction mode is selected, and if shifted to the left, the photographing mode is selected.

Provided at the right side of the rear face of the camera main body 2 is a four-gathered button Z (Z1–Z4). By selectively pressing these buttons Z1–Z4, the cursor K displayed on the finder display image in an overlap manner can be moved in any direction including a right-and-left direction and up-and-down direction.

As shown in FIG. 5, a battery cavity 18 and a slot 17 for receiving a memory card 8 are provided on the bottom face of the main body 2. The battery cavity 18 and the slot 17 are covered with a clam-shell type cover 15. The digital camera 1 according to this embodiment has a power supply source E consisting of four AA batteries connected in series.

Function keys F1, F2 corresponding to the menu displayed on the LCD 10 are provided at the rear face of the camera main body 2.

FIG. 6 is a block diagram of the control system of the digital camera 1.

First, the inner structure of the image sensing unit 3 will be explained. In the image sensing unit 3, the CCD 303 photoelectrically converts the optical image of the object focused by the macrozoom lens 301 into image signals of three color components R (red), G (green) and B (blue), and outputs the image signals to the signal processor 313. This image signal consists of sequence of pixel signals received by the respective pixels. A timing generator 314 generates various timing pulses for controlling and driving the CCD 303.

Since the diaphragm of the image sensing unit 3 is fixed, the exposure of the image sensing unit 3 is controlled by adjusting the quantity of exposure of the CCD 303, that is, the charge accumulation time of the CCD 303, which corresponds to the shutter speed. If the luminance of the object is too low to select to an appropriate shutter speed, the level of the image signal output from the CCD 303 is adjusted in order to compensate for the insufficient exposure. In other words, at low luminance, the exposure is controlled by adjusting both the shutter speed and the gain. The level of the image signal is adjusted by controlling the gain of the AGC circuit in the signal processor 313.

The timing generator 314 generates various driving control signals for the CCD 303 based on the reference clock supplied from the timing control circuit 202. The signals generated by the timing generator 314 includes a timing signal for starting and finishing integration (i.e., exposure), and clock signals (horizontal synchronization signals, vertical synchronization signals, transfer signals, etc.) for controlling the reading timing of the light-receiving signals from the respective pixels.

These signals are supplied to the CCD 303.

The signal processor 313 applies a prescribed analogue signal processing to the analog image signal output from the CCD 303. The signal processor 313 has a CDS (correlation double sampling) circuit for reducing the noise of the image signal and an AGC (automatic gain control) circuit for adjusting the level of the image signal by controlling the gain of this AGC circuit.

The light-quantity adjusting circuit 304 sets the light emission of the built-in flash lamp 5 to a predetermined level determined by the general controller 211 when the flash lamp 5 is used when taking an image. During the flash photographing, the flash light reflected from the object is received by the light-adjusting sensor 305 upon starting exposure. When the quantity of light received by the sensor 305 reaches a predetermined level, the light-quantity adjusting circuit 304 supplies a flash stop signal to the flash control circuit 214 via the general controller 211. In response to the flash stop signal, the flash control circuit 214 forcibly stops the light emission of the built-in flash lamp 5, whereby the light emission amount of the built-in flash lamp 5 can be regulated to the prescribed level.

The aforementioned image sensing unit 3 and the camera main body 2 are electrically connected each other by way of seven groups of connection terminals 334a, 334b, 334c, 334d, 334e, 334f, 334g provided at the connection surface 334 of the image sensing unit 3 and seven groups of connection terminals 234a, 234b, 234c, 234d, 234e, 234f, 234g provided at the connection surface 234 of the camera main body 2.

Next, the inner structure of the camera main body 2 will be explained. The A/D converter 205 provided in the main body 2 of the digital camera 1 converts each pixel signal (i.e., analog signal) of the image signal sequence into a 10-bit digital signal based on the A/D conversion clock supplied from the timing control circuit 202.

The timing control circuit 202 generates a reference clock and a clock for the timing generator 314 and the A/D converter, and is controlled by the general controller 211.

A black level correction circuit 206 corrects the black level of the digitalized pixel signal (hereinafter referred to as "pixel data") converted by the A/D converter 205 to the reference black level. A white balance circuit (hereinafter referred to as "WB circuit") 207 converts the level of the pixel data of each color component of R, G or B, so that the white balance can be adjusted after γ (gamma) correction. The WB circuit 207 converts the level of the pixel data of each color component R, G, B using a level conversion table input from the general controller 211. The conversion coefficient (the slope of the characteristic line) for each color component in the level conversion table is set each taken image by the general controller 211.

The γ (gamma) correction circuit 208 corrects for the γ (gamma) characteristic of the pixel data. An image memory 209 stores the pixel data output from the γ (gamma) correction circuit 208. The memory capacity of the image memory 209 corresponds to one frame data. Accordingly, if the CCD 303 has an n×m pixel matrix, the image memory 209 has a memory capacity of n×m pixel data, and each pixel data is stored in the corresponding pixel position in the image memory 209.

A VRAM 210 is a buffer memory for storing the image data which is to be reproduced and displayed on the LCD 10. The memory capacity of the VRAM 210 corresponds to the number of pixels of the LCD 10.

In the image taking preparation mode, each pixel data of the image taken by the image sensing unit 3 every 1/30 second is subjected to the prescribed signal processing by the sequence from the A/D converter 205 to the γ (gamma) correction circuit 208, and stored in the image memory 209. This pixel data is simultaneously transferred to the VRAM 210 via the general controller 211, and displayed on the LCD 10 (live-view display). The user can recognize the photographed object on the LCD 10. In the reproduction mode, the image read out from the memory card 8 is subjected to the prescribed signal processing by the general controller 211, which is then transferred to the VRAM 210, and displayed on the LCD 10.

A card I/F 212 is an interface for writing the image data into the memory card 8 or reading the image data from the memory card 8. A communication I/F 213 is an interface based on the USB standard for example, or an interface for connecting a personal computer 19.

A flash control circuit 214 controls the light emission of the built-in flash lamp 5. In particular, the flash control circuit 214 controls the quantity of flash light, the flash timing, and so on, based on the control signal supplied from the general controller 211. The flash control circuit 214 also brings the light emission to zero based on the flash stop signal input from the light-quantity adjusting circuit 304.

An RTC (Real Time Clock) 219 is a time circuit for keeping the track of the date and time of each photograph, which is driven by a separate power source (not shown).

An operation unit 250 has switches corresponding to the UP switch 6, the DOWN switch 7, the shutter button 9, the FL mode setting switch 11, the compression rate setting switch 12, the photographing/reproduction mode setting switch 14, the four gathered button Z and the function keys F1, F2.

The shutter button 9 is of a two-step type which can detect a half-pressed state (hereinafter referred to as "S1 state") and a full-pressed state (hereinafter referred to as "S2 state"), which is generally used in a silver-halide camera. When the shutter button 9 is half pressed (S1 state) in the image taking preparation state, the general controller 211 controls the AF motor M2 via the AF motor driving circuit 216 so that the contrast of the image data of the image memory 209 becomes maximum to execute the automatic focus processing of the image taking lens 310. When the shutter button 9 is released from the S1 state, the focus is locked at the position. The distance from the camera to the object can be obtained based on the moving 25 amount of the AF motor M2 from the reference position, and is stored in an inner memory (not shown) of the general controller 211.

The power switch PS is connected to a self holding circuit PSH connected to the general controller 211 via a voltage check circuit W. In a power-off state, since the self holding circuit PSH maintains a power-on state by pressing the power switch PS one time, the power supply to the general controller 211 and each block is maintained. On the other hand, in a power-on state, when the power switch PS is pressed, the pressing of the power switch PS is detected by the general controller 211. Simultaneously, the general controller 211 stops the power supply to the blocks not required to drive the zoom motor M1, and drives the zoom motor M1 by way of the zoom motor driving circuit 215 for a certain time to return the zoom lens 301 to the stand-by position. Then, the general controller 211 stops the power supply to the blocks required to drive the zoom motor M1 and itself.

The general controller 211 comprises a micro computer, and it organically controls the driving timing of each element in the image sensing unit 3 and the camera main body 2 so as to generally control the photographing operation of the digital camera 1. The general controller 211 includes an area calculation portion 2112 comprising an inner CPU, etc. for measuring the area S of the region surrounded by segments connecting each measuring points.

Furthermore, the general controller 211 has a luminance detector for determining an exposure control value (i.e., a shutter speed SS), and a shutter speed setting unit. In the image taking standby mode, the luminance detector detects the luminance of the object based on the image taken by the CCD 303 every 1/30 second. In other words, the luminance detector determines the luminance of the object from the image data updated and stored in the image memory 209.

The shutter speed setting unit determines the shutter speed SS (that is, the integral time of the CCD 303) based on the luminance of the object detected by the luminance detector.

The general controller 211 has a filter for filtering the photographed image and a recording image generator for generating a thumb nail image and a compressed image for recording the photographed image. Further provided to the general controller 211 is a reproduction image generator for generating a reproduction image for reproducing images recorded in the memory card 8 on the LCD 10.

The filter corrects the high frequency components of the image to be recorded by a digital filer to correct the contour of the image.

The recording image generator reads the pixel data out of the image memory 209, and generates a thumb nail image and a compressed image which are to be recorded in the memory card 8. To be more precise, the recording image generator scans the image memory 209 in the raster direction, and reads out every 8 pixels in both the horizontal and vertical directions to create a thumb nail image and record the thumb nail image.

The recording image generator also reads out the entire pixel data from the image memory 209, and applies a prescribed data compression process to these pixel data based on a JPEG method, such as two-dimensional DCT conversion or Hoffmann encoding, to create a compressed image data. The compressed image data is recorded in the primary image area of the memory card 8.

If, in the image taking mode, the shutter button 9 is pressed to start taking images, the general controller 211 creates a thumb nail image from the image taken in the image memory 209 after the instruction for taking images, and the compressed image created by a JPEG method at the compression rate set by the compression rate setting switch 12. A tag information (such as the frame number, exposure value, shutter speed, compression rate, date and time, flash ON/OFF data, scene information, judged result of the image, etc), the compressed image and the thumb nail image, are stored in the memory card 8.

Figure 9:
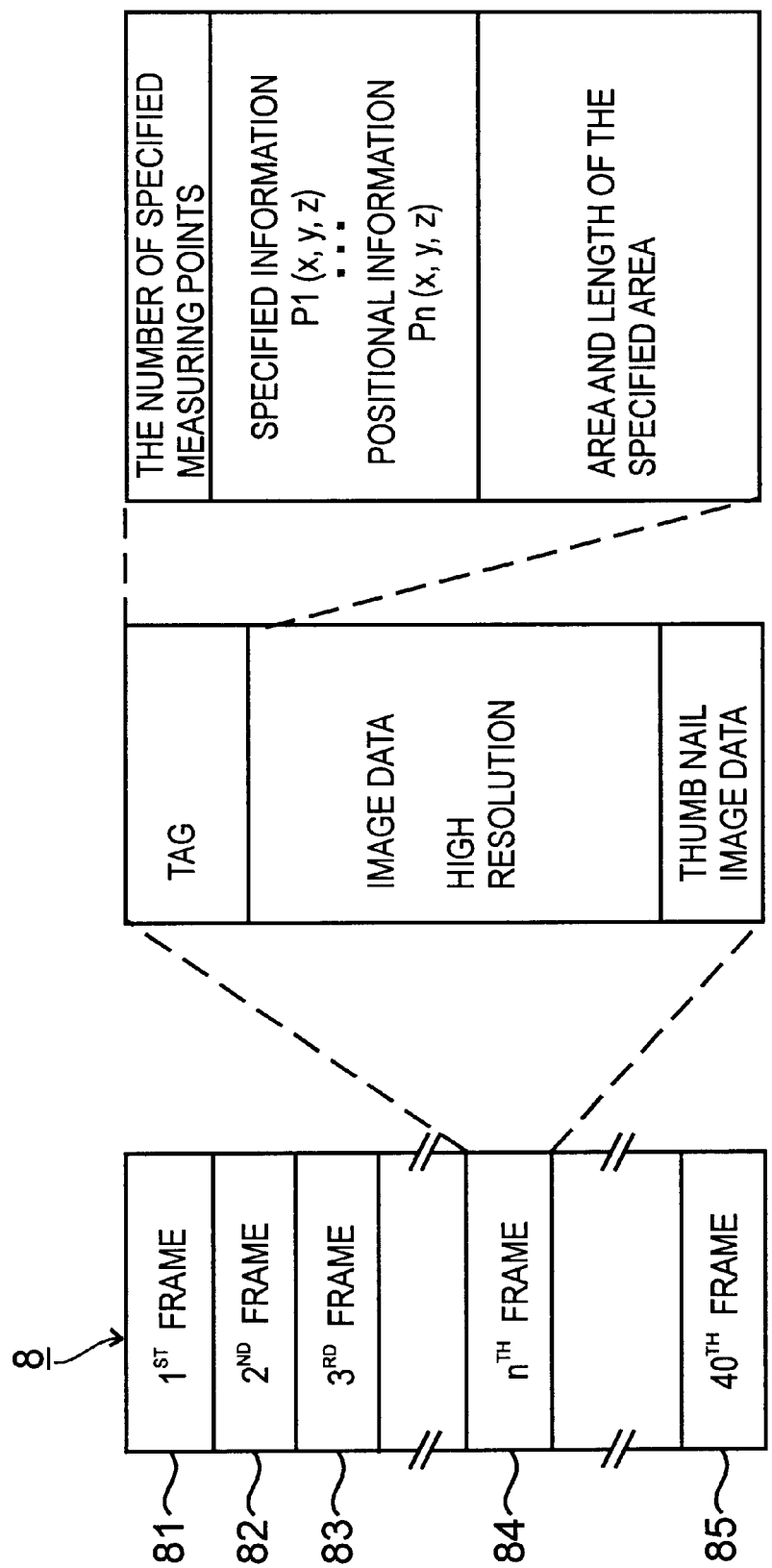
FIG. 9 illustrates an explanatory diagram showing a memory structure of a memory card used in the digital camera.

As shown in FIG. 9, the memory card 8 can store forty frames of images taken by the digital camera 1 at a 1/20 compression rate. Each of the frames 81–85 has tag information, high-resolution image data (640×480 pixels) compressed by a JPEG method, and thumb nail image data (80×60 pixels).

When the photographing/reproduction mode setting switch 14 is set to the reproduction mode, the image data having the largest frame number is read out of the memory card 8. The read out image data is extended, and transferred to the VRAM 210 so that the image data having the largest frame number, or the newest photographed image is displayed on the LCD 10. By operating the UP switch 6, the image data having a larger frame number is displayed. On the other hand, by operating the DOWN switch, the image data having a smaller frame number is displayed.

Explanation of the Operation

Figure 7:
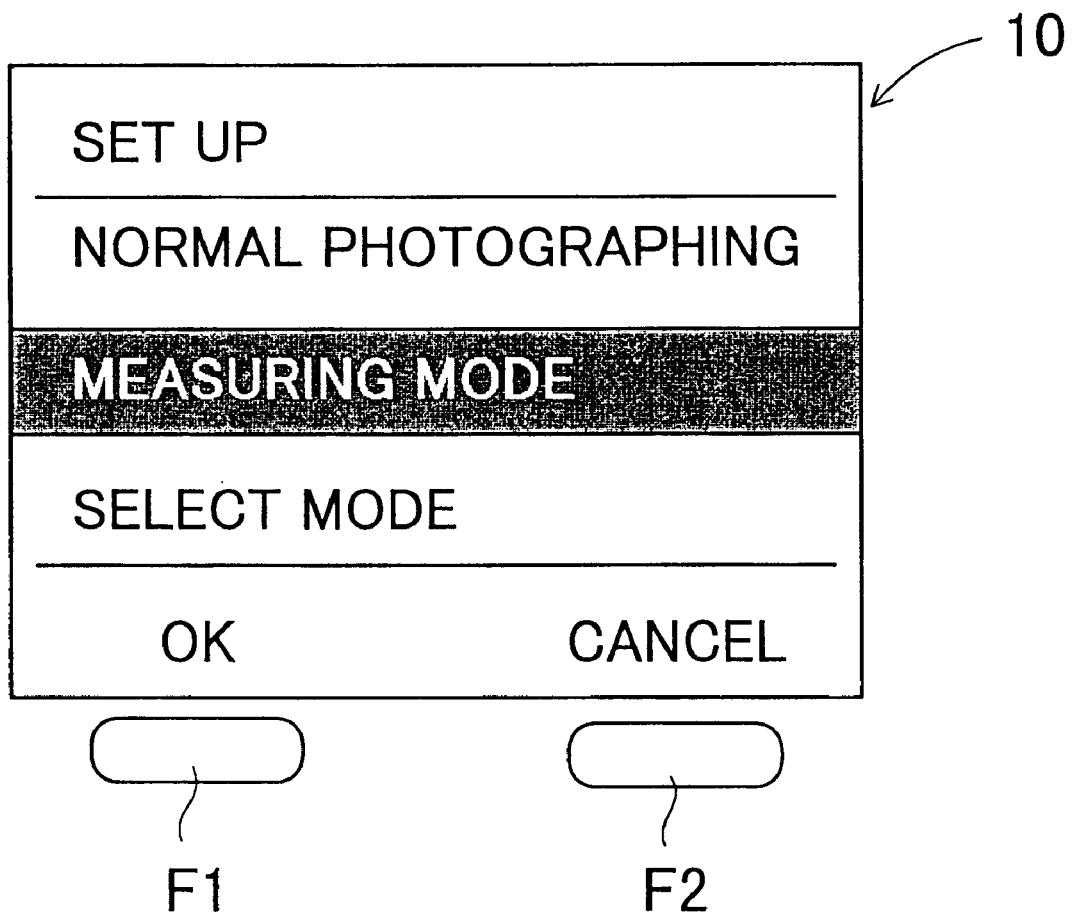
FIG. 7 illustrates a screen display when a measuring mode is selected in the digital camera.

When the power is turned on by pressing the power switch PS while pressing the function key F1, the mode is set to the setup mode. The LCD 10 displays the screen as shown in FIG. 7. By pressing the button Z3, Z4, the normal photographing mode and the measuring mode can be selected in a cyclic manner. In this state, when the function key F1 corresponding to "OK" is pressed, the mode changes.

Figure 8:
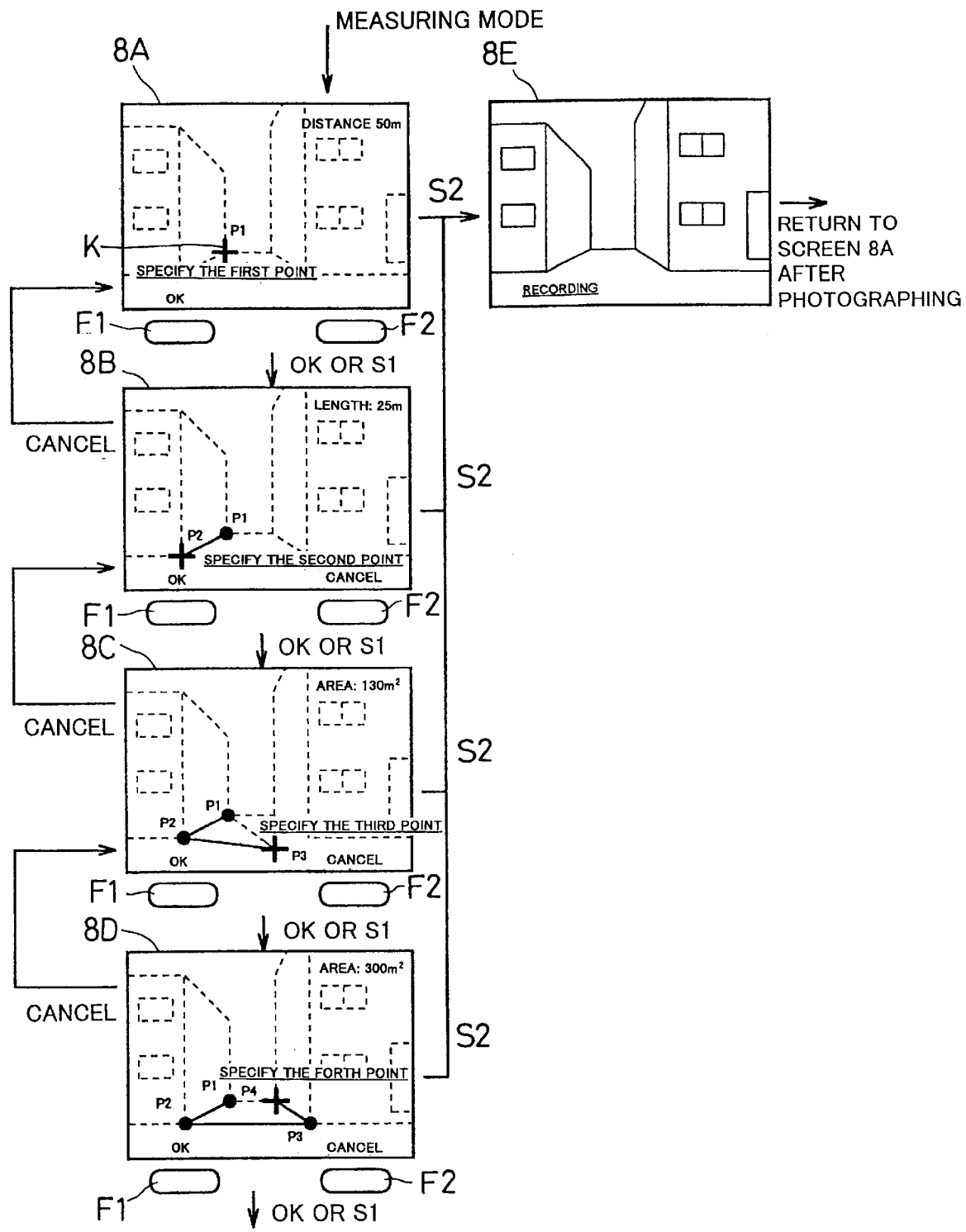
FIG. 8 illustrates a screen transient display showing a method for specifying measuring points in a measuring mode.

In the measuring mode, as shown in FIG. 8, the plus-shaped cursor K is displayed on the LCD 10 together with the live-view.

If the button Z1 is pressed, the cursor K moves left, and if the button Z2 is pressed, the cursor K moves right. If the button Z3 is pressed, the cursor K moves upward, and if the button Z4 is pressed, the cursor K moves downward. The focusing mechanism focuses the image on the position P1 of the cursor K, and the distance from the digital camera to the position P1 is measured from the displacement amount of the focusing motor M2 from the initial position, and is displayed on the upper right portion of the screen 8A. The aforementioned focusing and the distance measuring will be repeated as the cursor K moves, and the distance display is updated whenever the cursor K moves.

Furthermore, the angle formed between the segment connecting the camera position O and the measuring point P1 and the photographing direction C is calculated from the focus length of the image taking lens 301 (since the lens is a zoom lens, the displacement amount of the zoom motor M1 from the reference position corresponds to the focus length) and the positional difference of each position of the measuring points P1, P2 and P3 relative to the central direction C on the LCD 10. In addition, the elevation angle (or depression angle) $\theta$ of the photographing direction C is detected by the signal from the gyro J.

From the distance information of the measuring point P1, the angle information relative to the photographing direction C and the elevation angle (or depressing angle) $\theta$ of the photographing direction C, the position P1 (x, y, z) of the measuring point P1 in the coordinate system (x, y, z) shown in FIG. 1 is calculated, and is temporarily stored in the memory provided in the general controller 211.

In this state (screen 8A), if the function key F1 is pressed or the shutter button 9 is half-pressed, the first measuring point P1 is fixed, and the next measuring point P2 becomes ready to set (screen 8B).

In specifying the measuring point P2 on the screen 8B, the four-gathered buttons Z1–Z4 controls the cursor K in the same manner as mentioned above. The segment connecting the measuring point P1 and the measuring point P2 is displayed on the screen.

In the screen 8B, the distance between the measuring point P1 and the measuring point P2 is calculated by obtaining the position of the measuring point P2, and is displayed on the right upper portion of the screen.

In this state (screen 8B), if the function key F1 is pressed or the shutter button 9 is half-pressed, the second measuring point P2 is fixed, and the next measuring point P3 becomes ready to set (screen 8C).

In specifying the measuring point P3 on the screen 8C, the four-gathered buttons Z1–Z4 controls the cursor K in the same manner as mentioned above. The segment connecting the measuring points P1 and P2 and the segment connecting the measuring points P2 and P3 are displayed on the screen. Furthermore, a triangular shape connecting the measuring points P1, P2 and P3 is also displayed on the screen. In the screen 8C, the area calculation portion 2112 calculates the area of $\Delta P1P2P3$ by obtaining the relative position of the measuring point P3, and is displayed on the right upper portion of the screen. Thus, the photographer can immediately confirm the area S of the specified region.

At this stage, the area to be displayed on the LCD 10 may be the actual area corresponding to $\Delta P1P2P3$ shown in FIG. 1, or may be the projected actual area of $\Delta P1P2P3$ projected on the horizontal plane xy (the actual area of $\Delta P1aP2aP3a$ shown in FIG. 1). These switching may be added to the menu of the setup mode shown in FIG. 7.

In a case where the actual area corresponding to $\Delta P1P2P3$ is measured, each distance between the measuring points may be calculated from the distance information of each measuring point and the mutual angle information on the measuring points, and then the actual area corresponding to $\Delta P1P2P3$ may be calculated. In this case, it is not necessarily required to obtain the position of each measuring position in the xyz-coordinate system shown in FIG. 1.

As mentioned above, if three measuring points P1, P2 and P3 are specified arbitrarily on the screen of the LCD 10, the triangular shaped area surrounded by the segments connecting these measuring points P1, P2 and P3 can be easily calculated.

Furthermore, since the horizontal plane (xy-plane) can be specified in the photographing view by obtaining the elevation angle (or depressing angle) θ relative to the photographing direction C, the height of each measuring point P1, P2 or P3 can be easily measured. If necessary, the height may be displayed on the LCD 10.

To specify the fourth measuring point, the function key F1 is pressed, or the shutter button 9 is half-pressed on the screen 8C shown in FIG. 8 after specifying the three measuring points P1, P2 and P3. Similarly, the fifth and sixth measuring points P5, P6 can be specified. Whenever a triangular shape is specified, the area thereof can be measured. Therefore, even an area of a polygonal shape other than a triangle shape or an irregular shape can be easily measured.

In the screens 8B, 8C, 8D, when the function key F2 corresponding to the display "cancel" is pressed, the screen returns to the previous one. Therefore, even if it fails to specify the measuring point, the measuring point can be specified again immediately.

In the screens (8A–8D), when the shutter button 9 is fully pressed, the recording message shown in the screen 8E is displayed, and the image data when the shutter button 9 is pressed and the measuring status are recorded in the memory card 8. By this record, the photographer can utilize the measured information at any time.

The memory card 8 has a format as shown in FIG. 9, and records the image data of each frame in the photographing order. The image data of each frame is recorded in the memory card 8 as the image data of high resolution, the reduced image data of the thumb nail image and the tag information.

Recorded in the tag are the number of measuring points n, the relative position information P1 (x, y, z), . . . Pn(x, y, z) of n measuring points, the distance between the measuring points (in a case where it is recorded by fully pressing the shutter button 9 in the screen 8B), and the area of the region surrounded by segments connecting the measuring points P1, . . . Pn (in a case where it is recorded by fully pressing the shutter button 9 in the screen 8C or subsequent screens).

Figure 10:
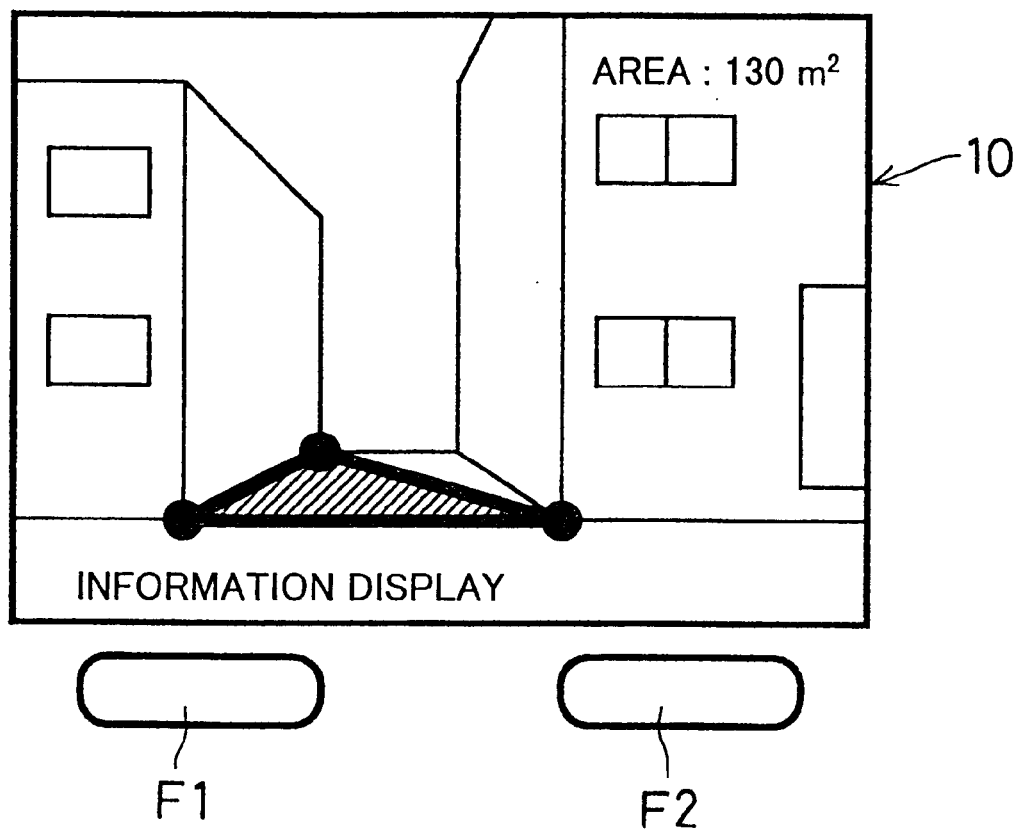
FIG. 10 illustrates a screen display in a reproduction mode of the digital camera.

On the other hand, in a case where the photographed image is read out of the memory card 8 and reproduced on the LCD, as shown in FIG. 10, the region surrounded by segments connecting the measuring points is displayed so as to easily be recognized, and is displayed together with the photographed image in an overlapped manner. By pressing the function key F1, the display of the measuring points and the area are turned on and off so as to display only the photographed image. Since the measured results are displayed together with the photographed image in an overlapped manner, the measured results can be easily recognized by comparing to the photographed image.

In the aforementioned embodiment, although the horizontal plane is set to the reference plane by detecting the elevation angle or depressing angle of the photographing direction C, the reference plane is not limited to the horizontal plane.

As mentioned above, according to the above embodiment, since the actual area of the region surrounded by the segments connecting the measuring points is measured based on the distance information and the angle information on the measuring points, an area of any desired place away from the photographing position can be easily recognized.

Since the reference plane such as a horizontal plane can be specified in the photographing view by detecting the angle of the photographing direction relative to the reference plane, the relative position of the measuring point relative to the photographing position can be calculated. Therefore, the height of the object or the like can be measured.

Furthermore, since the measured information is displayed on the LCD, the photographer can immediately recognize the measured information.

In addition, since the measured information is recorded together with the photographed image, the image of the object and the measured information recorded can be utilized at any time.

Furthermore, the measured information is displayed on the LCD when reproducing the photographed image, it is not required to reproduce only the measured information, and the measured information and the photographed image can be recognized in comparison to each other.

The measuring specifying unit is provided with a cursor movable on the screen of the LCD, and the focusing mechanism focuses the image on the cursor position. Therefore, the measuring point can be easily and simply specified by using the cursor.

Since the segments connecting the measuring points are displayed on the screen of the LCD, the user can easily recognize the specified region which area is to be measured.

The terms and descriptions in this specification are used only for explanatory purposes and the present invention is not limited to these terms and descriptions. It should be appreciated that there are many modifications and substitutions without departing from the spirit and the scope of the present invention which is defined by the appended claims.

What is claimed is:

1. A digital camera, comprising:
   a display for displaying an image of an object;
   a specifying unit for specifying a plurality of measuring points on said display; and
   a calculator for calculating an actual area of a region surrounded by said plurality of measuring points specified by said specifying unit.

2. The digital camera as recited in claim 1, further comprising a distance measuring device for measuring a distance from said digital camera to said measuring points, wherein said calculator calculates said actual area based on distance information on said plurality of measuring points.

3. The digital camera as recited in claim 2, wherein said calculator calculates said actual area based on distance information on said plurality of measuring points and a focal length of a photographing lens.

4. The digital camera as recited in claim 2, wherein said calculator calculates said actual area based on distance information on said plurality of measuring points and angle information on said measuring points.

5. The digital camera as recited in claim 2, wherein said specifying unit includes a cursor movable on said display, and wherein said distance measuring device measures said distance regarding the image pointed by said cursor.

6. The digital camera as recited in claim 1, wherein said display shows a calculated result of said calculator.

7. The digital camera as recited in claim 1, wherein said display displays a segment connecting said measuring points specified by said specifying unit.

8. The digital camera as recited in claim 1, wherein a calculated result of said calculator is recorded in recording medium together with a photographed image.

9. The digital camera as recited in claim 8, wherein said display displays said calculated result together with the photographed image when the photographed image recorded in said recording medium is reproduced.

10. A method for calculating an area of an object in a digital camera, including the steps of:

displaying an image of the object on a display;

calculating a distance from said digital camera to each of a plurality of measuring points specified on said display;

calculating an angle of each of said plurality of measuring points relative to said camera; and calculating an actual area of a region surrounded by said plurality of measuring points based on said calculated distances and said angles.

11. A digital camera, comprising:

a display for displaying an image of an object;

a specifying unit for specifying a plurality of measuring points on said display;

a first detector for detecting a distance from said digital camera to each of said plurality of measuring points of the object;

a second detector for detecting an angle of each of said plurality of measuring points relative to said camera;

a third detector for detecting a photographing direction; and a calculator for calculating a relative position of each of said plurality of measuring points relative to a photographing position based on detected results of said first, second and third detectors.

12. The digital camera as recited in claim 11, wherein said second detector detects said angle based on distance information on said plurality of measuring points and a focal length of a photographing lens.

13. The digital camera as recited in claim 11, wherein said third detector detects a photographing angle relative to a reference plane.

14. The digital camera as recited in claim 13, wherein a projected area of a region surrounded by said plurality of measuring points relative to said reference plane is calculated based on a relative position of said measuring points calculated by said calculator.

15. The digital camera as recited in claim 14, wherein said display displays said calculated area information.

16. The digital camera as recited in claim 14, wherein said calculated area information is recorded in a recording medium together with a photographed image.

17. The digital camera as recited in claim 14, wherein said display displays said calculated area information together with the image when the image recorded in said recording medium is reproduced.

18. The digital camera as recited in claim 11, wherein said display displays a segment connecting said measuring points specified by said specifying unit.

19. The digital camera as recited in claim 11, wherein said specifying unit includes a cursor movable on said display, and wherein said first detector measures a distance from said digital camera to the image pointed by said cursor.

20. A method for calculating a relative position of an object relative to a digital camera, including the steps of:

displaying an image of the object on a display;

calculating a distance from said digital camera to each of a plurality of measuring points specified on said display;

detecting an angle of each of said plurality of measuring points relative to said camera;

detecting a photographing direction; and calculating a relative position of said measuring points relative to the photographing position based on information on the detected distance of the object, angles and photographing direction.

* * * * *